(12) United States Patent
Hammen

(10) Patent No.: US 10,133,948 B2
(45) Date of Patent: Nov. 20, 2018

(54) DEVICE AND METHOD FOR PERFORMING OPTICAL CHARACTER RECOGNITION

(71) Applicant: SANOFI-AVENTIS DEUTSCHLAND GMBH, Frankfurt am Main (DE)

(72) Inventor: Dietmar Hammen, Franfkurt am Main (DE)

( * ) Notice: Subject to any disclaimer, the term of this patent is extended or adjusted under 35 U.S.C. 154(b) by 0 days.

(21) Appl. No.: 15/324,506

(22) PCT Filed: Jul. 9, 2015

(86) PCT No.: PCT/EP2015/065669
§ 371 (c)(1),
(2) Date: Jan. 6, 2017

(87) PCT Pub. No.: WO2016/005483
PCT Pub. Date: Jan. 14, 2016

(65) Prior Publication Data
US 2017/0154232 A1 Jun. 1, 2017

(30) Foreign Application Priority Data
Jul. 10, 2014 (EP) ..... 14176482

(51) Int. Cl.
*G06K 9/00* (2006.01)
*G06K 9/22* (2006.01)
(Continued)

(52) U.S. Cl.
CPC ........... *G06K 9/222* (2013.01); *G06K 9/342* (2013.01); *G06K 9/4604* (2013.01); *G06K 2209/01* (2013.01)

(58) Field of Classification Search
CPC .......... G06K 9/00–9/82; G06K 2209/01
See application file for complete search history.

(56) References Cited

U.S. PATENT DOCUMENTS 4,580,231 A * 4/1986 Tidd ............... B41B 27/00
715/202
5,253,304 A * 10/1993 LeCun ............. G06K 9/342
382/102
(Continued)

FOREIGN PATENT DOCUMENTS

WO WO 2011/117212 9/2011
WO WO 2013/120777 8/2013

OTHER PUBLICATIONS

"The study of license plate character segmentation algorithm based on vetical projection", Consumer Electronics, Communications and Networks (CECNet), 2011 International Conference on IEEE 2011.*

(Continued)

Primary Examiner — Sean Motsinger

(57) ABSTRACT

A method of performing character isolation in an optical character recognition process, the method comprising receiving image data representing one or more character columns, determining a number of black pixels in each column of the image data, defining a vertical separation threshold which is a maximum number of black pixels in a column, dividing the columns into different pixel groups and groups of excluded columns by excluding any columns with a number of black pixels below the vertical separation threshold, identifying the pixel group representing the left most character column in the image data, determining whether there are one or two pixel groups representing character columns in the image data and, if it is determined that there are two pixel groups representing character columns, using a predetermined width value for a right most character column in order to identify a right hand boundary of the right most character column.

17 Claims, 8 Drawing Sheets

(51) Int. Cl.
*G06K 9/34* (2006.01)
*G06K 9/46* (2006.01)

(56) References Cited

U.S. PATENT DOCUMENTS

| | | | | |
|---|---|---|---|---|
| 5,815,595 A * | 9/1998 | Gugler | ............. | G06K 9/2054 |
| | | | | 382/173 |
| 6,473,517 B1 * | 10/2002 | Tyan | ............. | G06K 9/344 |
| | | | | 382/105 |
| 6,614,930 B1 * | 9/2003 | Agnihotri | ............. | G06K 9/325 |
| | | | | 382/173 |
| 2001/0033694 A1 * | 10/2001 | Goodman | ............. | G06K 9/00859 |
| | | | | 382/229 |
| 2008/0008376 A1 * | 1/2008 | Andel | ............. | G06K 9/00463 |
| | | | | 382/141 |
| 2010/0275111 A1 * | 10/2010 | Bastos dos Santos | ............. | |
| | | | | G06F 17/243 |
| | | | | 715/227 |
| 2011/0271177 A1 * | 11/2011 | Bastos dos Santos | ............. | |
| | | | | G06F 17/243 |
| | | | | 715/256 |
| 2012/0106802 A1 * | 5/2012 | Hsieh | ............. | G06K 9/3258 |
| | | | | 382/105 |
| 2013/0294654 A1 * | 11/2013 | Burry | ............. | G06K 9/34 |
| | | | | 382/105 |
| 2014/0003723 A1 * | 1/2014 | Lu | ............. | G06K 9/3258 |
| | | | | 382/182 |
| 2014/0219561 A1 * | 8/2014 | Nakamura | ............. | G06K 9/344 |
| | | | | 382/176 |
| 2015/0286860 A1 * | 10/2015 | Ruiz-Tapiador | ............. | G06K 9/32 |
| | | | | 382/112 |
| 2016/0092417 A1 * | 3/2016 | Fang | ............. | G06F 17/24 |
| | | | | 382/172 |
| 2016/0328366 A1 * | 11/2016 | Elarian | ............. | G06F 17/214 |
| 2017/0124719 A1 * | 5/2017 | Long | ............. | G06T 7/0081 |

OTHER PUBLICATIONS

International Preliminary Report on Patentability in International Application No. PCT/EP2015/065669, dated Jan. 10, 2017, 9 pages.
International Search Report and Written Opinion in International Application No. PCT/EP2015/065669, dated Sep. 21, 2015, 12 pages.
Shan Du et al., "Automatic License Plate Recognition (ALPR): A State-of-the-Art Review", IEEE Transactions on Circuits and Systems for Video Technology 23(2):311-325, Feb. 1, 2013.

* cited by examiner

DEVICE AND METHOD FOR PERFORMING OPTICAL CHARACTER RECOGNITION

CROSS-REFERENCE TO RELATED APPLICATIONS

This application is a U.S. national stage application under 35 USC § 371 of International Application No. PCT/EP2015/065669, filed on Jul. 9, 2015, which claims priority to European Patent Application No. 14176482.9 filed on Jul. 10, 2014, the entire contents of which are incorporated herein by reference.

TECHNICAL FIELD

The present disclosure relates to a device and method for performing optical character recognition (OCR). The device may be a supplemental device for attachment to and use with a medical device, such as an injection device.

BACKGROUND

In the field of medical devices, OCR technology is not often used where there is a need for very high accuracy, for example to prevent miss-dosing of a medicament. Thus many mechanical based devices also have dosing scales or readouts which must be manually read and the dose manually recorded. This is time consuming for a user and could potentially lead to errors. Also, if data is to be transmitted electronically and/or analysed electronically, it must first be input manually into a separate electronic device. Furthermore, it may be difficult for some patients (for example those with poor eyesight) to read a mechanical readout, which are often small.

A variety of diseases exists that require regular treatment by injection of a medicament. Such injection can be performed by using injection devices, which are applied either by medical personnel or by patients themselves. As an example, type-1 and type-2 diabetes can be treated by patients themselves by injection of insulin doses, for example once or several times per day. For instance, a pre-filled disposable insulin pen can be used as an injection device. Alternatively, a re-usable pen may be used. A re-usable pen allows replacement of an empty medicament cartridge by a new one. Either pen may come with a set of one-way needles that are replaced before each use. The insulin dose to be injected can then for instance be manually selected at the insulin pen by turning a dosage knob and observing the actual dose from a dose window or display of the insulin pen. The dose is then injected by inserting the needle into a suited skin portion and pressing an injection button of the insulin pen. To be able to monitor insulin injection, for instance to prevent false handling of the insulin pen or to keep track of the doses already applied, it is desirable to measure information related to a condition and/or use of the injection device, such as for instance information on the injected insulin type and dose.

SUMMARY

A first aspect provides a method of performing character isolation in an optical character recognition process, the method comprising:
receiving image data representing one or more character columns;
determining a number of black pixels in each column of the image data;
defining a vertical separation threshold which is a maximum number of black pixels in a column;
dividing the columns into different pixel groups and groups of excluded columns by excluding any columns with a number of black pixels below the vertical separation threshold;
identifying the pixel group representing the left most character column in the image data;
determining whether there are one or two pixel groups representing character columns in the image data; and
if it is determined that there are two pixel groups representing character columns, using a predetermined width value for a right most character column in order to identify a right hand boundary of the right most character column.

This method allows the characters in the right most character column to be correctly segmented and isolated, even where they are merged with a right hand margin/frame area. Correct segmentation and isolation of the characters in the image data allows an accurate and reliable OCR process to be performed, which is particularly important for use of OCR technology in medical applications.

Identifying the pixel group representing the left most character column in the image data may comprise identifying the pixel group immediately to the right of the left most group of excluded columns.

Identifying pixel group representing the left most character column in the image data may comprise excluding the pixel group immediately to the right of the left most group of excluded columns if it is below a minimum digit width threshold such that the second pixel group to the right of the left most group of excluded columns is defined as the left most character column in the image data. This process accounts for (and disregards) the smaller "1" which is printed between "0" and "2" in many devices with which the character isolation method can be used.

Determining whether there are one or two pixel groups representing character columns in the image data may comprise determining the width of the left most group of excluded columns. The left most group of excluded columns represents the white space to the left of the left most group of digits. The width of this region depends on whether the visible numbers comprise one or two digits each.

If it is determined that the width of the left most group of excluded columns is below a maximum left margin threshold value, the method may further comprise determining that there are two pixel groups representing character columns in the image data.

The method may further comprise determining the width of the left most character column in the image data. The method may further comprise using the determined width of the left most character column in the image data to determine whether the left most character column comprises exclusively narrow numbers or includes wide numbers. If it is determined that the left most character column comprises exclusively narrow numbers, the method may further comprise setting the maximum valid dose result to "19". Since the number "1" differs significantly in width from every other number, it is important for the accuracy of the subsequent OCR process to identify whether the left most digit is a "1" or not.

The method may further comprise excluding any pixel group touching the left hand border of the image. In some instances there may be a left hand frame region which should be identified as not representing character data and excluded.

The method may further comprise indentifying a left hand boundary of the right hand character column by identifying a group of excluded columns located between the left hand and right hand character columns. This process identifies the gap between the digits in a two digit number. The OCR algorithm may require that each digit is separated in order to be correctly identified.

The method may further comprise determining if the left hand character column is wider than a maximum digit width threshold value and if so, determining that numbers in the image data are in the range 8 to 10. This situation can occur where the number "8" is visible in the image data above or below the number "10". In this case it is difficult to separate the characters into columns. However, by limiting the potential valid results to "8", "9" or "10", an accurate result can still be returned.

A second aspect provides a processor for performing character isolation in an optical character recognition process, the processor configured to:

receive image data representing one or more character columns;

determine a number of black pixels in each column of the image data;

define a vertical separation threshold which is a maximum number of black pixels in a column;

divide the columns into different pixel groups and groups of excluded columns by excluding any columns with a number of black pixels below the vertical separation threshold;

identify the pixel group representing the left most character column in the image data;

determine whether there are one or two pixel groups representing character columns in the image data; and if it is determined that there are two pixel groups representing character columns, use a predetermined width value for a right most character column in order to identify a right hand boundary of the right most character column.

The processor may be configured to indentify the pixel group representing the left most character column in the image data by identifying the pixel group immediately to the right of the left most group of excluded columns.

The processor may be configured to determine whether there are one or two pixel groups representing character columns in the image data by determining the width of the left most group of excluded columns.

A third aspect provides a supplemental device for attachment to an injection device, the supplemental device comprising:

an imaging arrangement configured to capture an image of one or more numbers present on a moveable component of the injection device; and a processor according to the second aspect.

BRIEF DESCRIPTION OF THE FIGURES

The figures show:

FIG. 1b shows a perspective view of some detail of the drug delivery device of FIG. 1a;

DETAILED DESCRIPTION

In the following, embodiments of the present disclosure will be described with reference to an insulin injection device. The present disclosure is however not limited to such application and may equally well be deployed with injection devices that eject other medicaments, or with other types of medical devices, such as syringes, needleless injectors and inhalers.

Figure 1A:
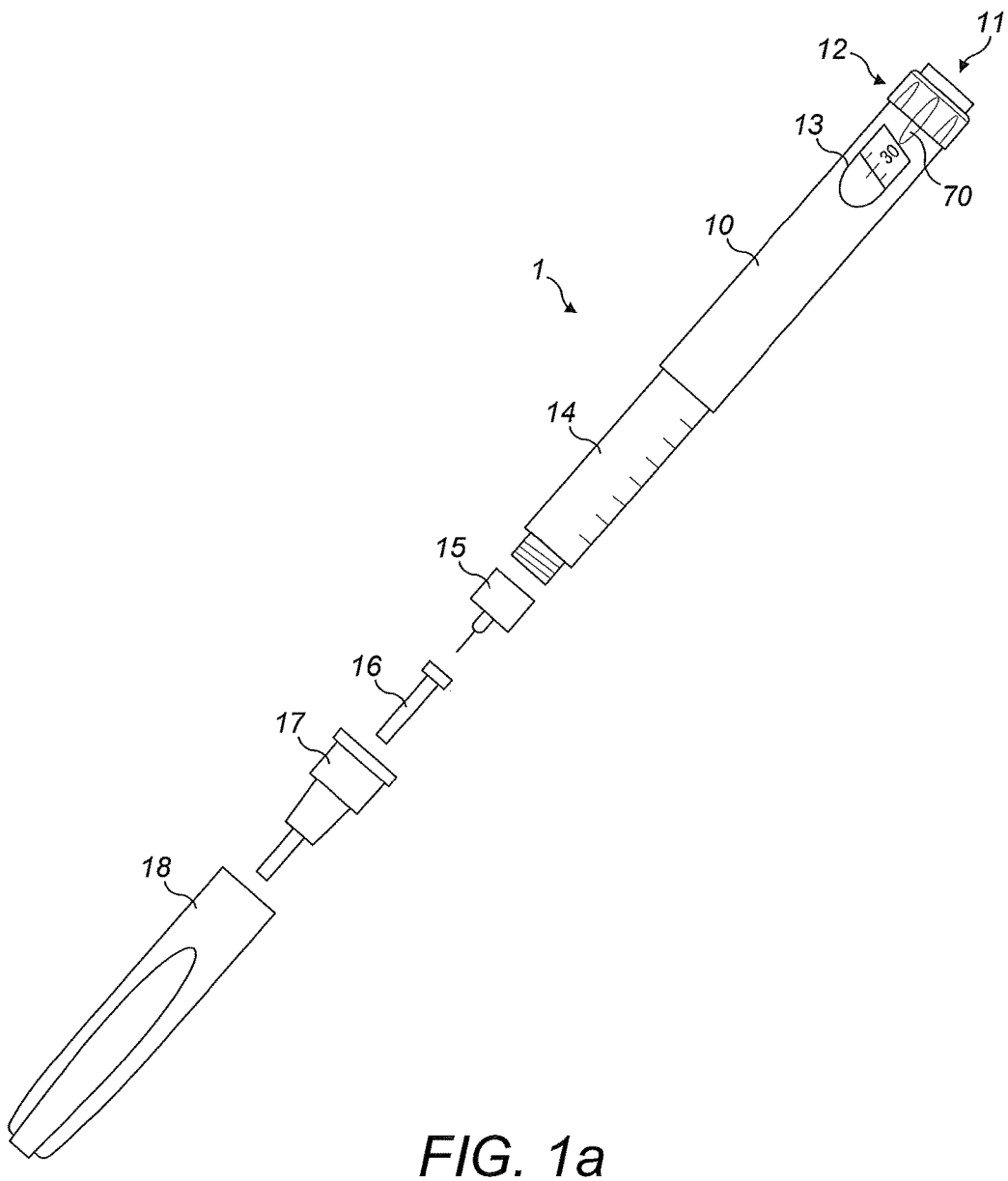
FIG. 1a: an exploded view of an drug delivery device.

FIG. 1a is an exploded view of an injection device 1, which may for instance represent Sanofi's Solostar® insulin injection pen.

The injection device 1 of FIG. 1a is a pre-filled, disposable injection pen that comprises a housing 10 and contains an insulin container 14, to which a needle 15 can be affixed. The needle is protected by an inner needle cap 16 and an outer needle cap 17, which in turn can be covered by a cap 18. An insulin dose to be ejected from injection device 1 can be selected by turning the dosage knob 12, and the selected dose is then displayed via dosage window 13, for instance in multiples of so-called International Units (IU), wherein one IU is the biological equivalent of about 45.5 micrograms of pure crystalline insulin (1/22 mg). An example of a selected dose displayed in dosage window 13 may for instance be 30 IUs, as shown in FIG. 1a. It should be noted that the selected dose may equally well be displayed differently. A label (not shown) is provided on the housing 10. The label includes information about the medicament included within the injection device, including information identifying the medicament. The information identifying the medicament may be in the form of text. The information identifying the medicament may also be in the form of a colour. The information identifying the medicament may also be encoded into a barcode, QR code or the like. The information identifying the medicament may also be in the form of a black and white pattern, a colour pattern or shading.

Turning the dosage knob 12 causes a mechanical click sound to provide acoustical feedback to a user. The numbers displayed in dosage window 13 are present on a sleeve by printing and the sleeve is contained in housing 10 and mechanically interacts with a piston in insulin container 14. When needle 15 is stuck into a skin portion of a patient, and then injection button 11 is pushed, the insulin dose displayed in display window 13 will be ejected from injection device 1. When the needle 15 of injection device 1 remains for a certain time in the skin portion after the injection button 11 is pushed, a high percentage of the dose is actually injected into the patient's body. Ejection of the insulin dose also causes a mechanical click sound, which is however different from the sounds produced when using dosage knob 12.

Injection device 1 may be used for several injection processes until either insulin container 14 is empty or the expiration date of injection device 1 (e.g. 28 days after the first use) is reached.

Furthermore, before using injection device 1 for the first time, it may be necessary to perform a so-called "prime shot" to remove air from insulin container 14 and needle 15, for instance by selecting two units of insulin and pressing injection button 11 while holding injection device 1 with the needle 15 upwards.

For simplicity of presentation, in the following, it will be exemplarily assumed that the ejected doses substantially correspond to the injected doses, so that, for instance when making a proposal for a dose to be injected next, this dose equals the dose that has to ejected by the injection device. Nevertheless, differences (e.g. losses) between the ejected doses and the injected doses may of course be taken into account.

Figure 1B:
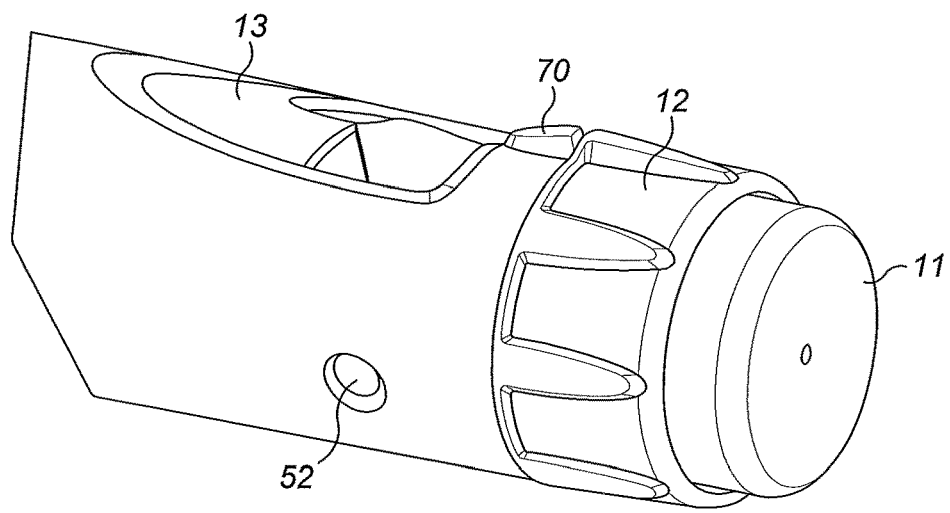

FIG. 1b is a close-up of the end of the injection device 1. The injection device has a guiding rib 70 located on the housing 10 adjacent the dosage knob 12. The injection device 1 also has two indents 52 located on the housing 10. These may be symmetrical in relation to the guiding rib 70. The guiding rib 70 and indents 52 act to secure a supplementary device (described in detail below) in the correct position on the injection device 1.

Figure 2A:
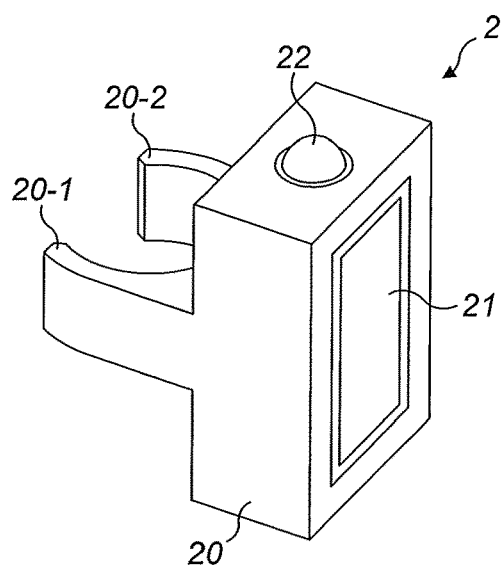
FIG. 2a: a schematic illustration of a sensor device to be releasably attached to the drug delivery device of FIGS. 1a and 1b according to an aspect of the present disclosure.

FIG. 2a is a schematic illustration of an embodiment of a supplementary device 2 to be releasably attached to injection device 1 of FIG. 1a. Supplementary device 2 comprises a housing 20 with a mating unit configured and embrace the housing 10 of injection device 1 of FIG. 1a, so that supplementary device 2 sits tightly on housing 10 of injection device 1, but is nevertheless removable from injection device 1, for instance when injection device 1 is empty and has to be replaced. FIG. 2a is highly schematic, and details of the physical arrangement are described below with reference to FIG. 2b.

Supplementary device 2 contains optical and acoustical sensors for gathering information from injection device 1. At least a part of this information, for instance a selected dose (and optionally a unit of this dose), is displayed via display unit 21 of supplementary device 2. The dosage window 13 of injection device 1 is obstructed by supplementary device 2 when attached to injection device 1.

Supplementary device 2 further comprises at least one user input transducer, illustrated schematically as a button 22. These input transducers 22 allow a user to turn on/off supplementary device 2, to trigger actions (for instance to cause establishment of a connection to or a pairing with another device, and/or to trigger transmission of information from supplementary device 2 to another device), or to confirm something.

Figure 2B:
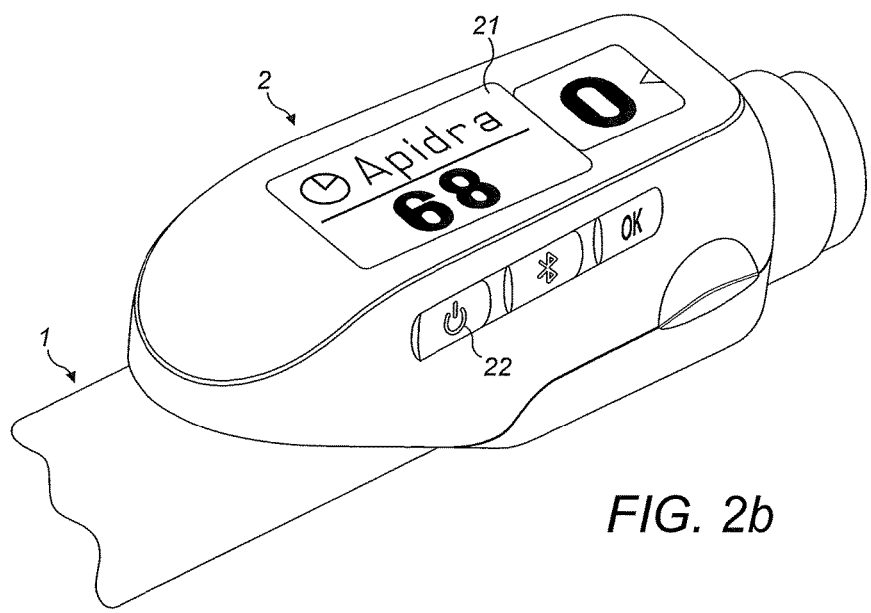
FIG. 2b: a perspective view of a sensor device to be releasably attached to the drug delivery device of FIGS. 1a and 1b according to various aspects of the present disclosure.

FIG. 2b is a schematic illustration of a second embodiment of a supplementary device 2 to be releasably attached to injection device 1 of FIG. 1a. Supplementary device 2 comprises a housing 20 with a mating unit configured and embrace the housing 10 of injection device 1 of FIG. 1, so that supplementary device 2 sits tightly on housing 10 of injection device 1, but is nevertheless removable from injection device 1.

Information is displayed via display unit 21 of supplementary device 2. The dosage window 13 of injection device 1 is obstructed by supplementary device 2 when attached to injection device 1.

Supplementary device 2 further comprises three user input buttons or switches. A first button 22 is a power on/off button, via which the supplementary device 2 may for instance be turned on and off. A second button 33 is a communications button. A third button 34 is a confirm or OK button. The buttons 22, 33, 34 may be any suitable form of mechanical switch. These input buttons 22, 33, 34 allow a user to turn on/off supplementary device 2, to trigger actions (for instance to cause establishment of a connection to or a pairing with another device, and/or to trigger transmission of information from supplementary device 2 to another device), or to confirm something.

Figure 2C:
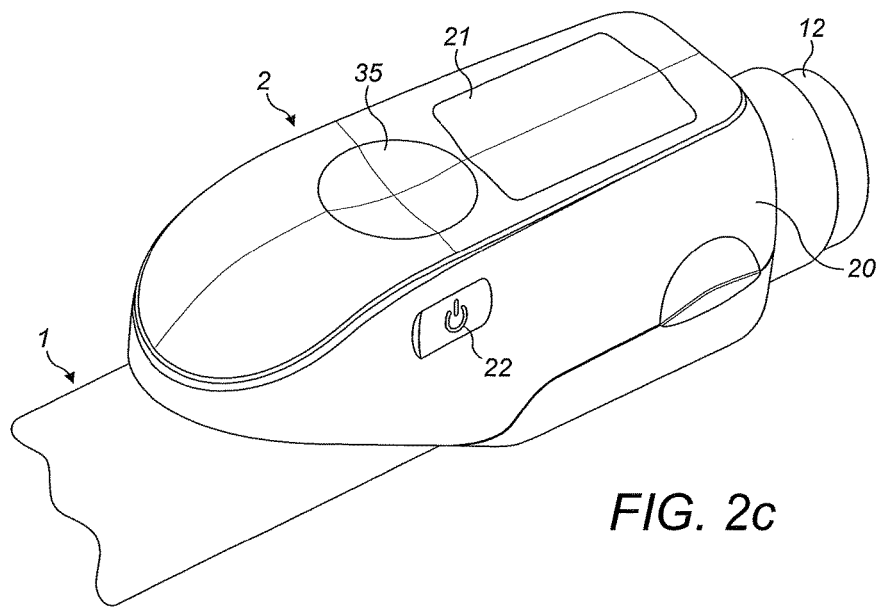
FIG. 2c: a perspective view of a sensor device to be releasably attached to the drug delivery device of FIGS. 1a and 1b according to other aspects of the present disclosure.

FIG. 2c is a schematic illustration of a third embodiment of a supplementary device 2 to be releasably attached to injection device 1 of FIG. 1a. Supplementary device 2 comprises a housing 20 with a mating unit configured to embrace the housing 10 of injection device 1 of FIG. 1a, so that supplementary device 2 sits tightly on housing 10 of injection device 1, but is nevertheless removable from injection device 1.

Information is displayed via display unit 21 of the supplementary device 2. The dosage window 13 of injection device 1 is obstructed by supplementary device 2 when attached to injection device 1.

Supplementary device 2 further comprises a touch-sensitive input transducer 35. It also comprises a single user input button or switch 22. The button 22 is a power on/off button, via which the supplementary device 2 may for instance be turned on and off. The touch sensitive input transducer 35 can be used to trigger actions (for instance to cause establishment of a connection to or a pairing with another device, and/or to trigger transmission of information from supplementary device 2 to another device), or to confirm something.

Figure 3:
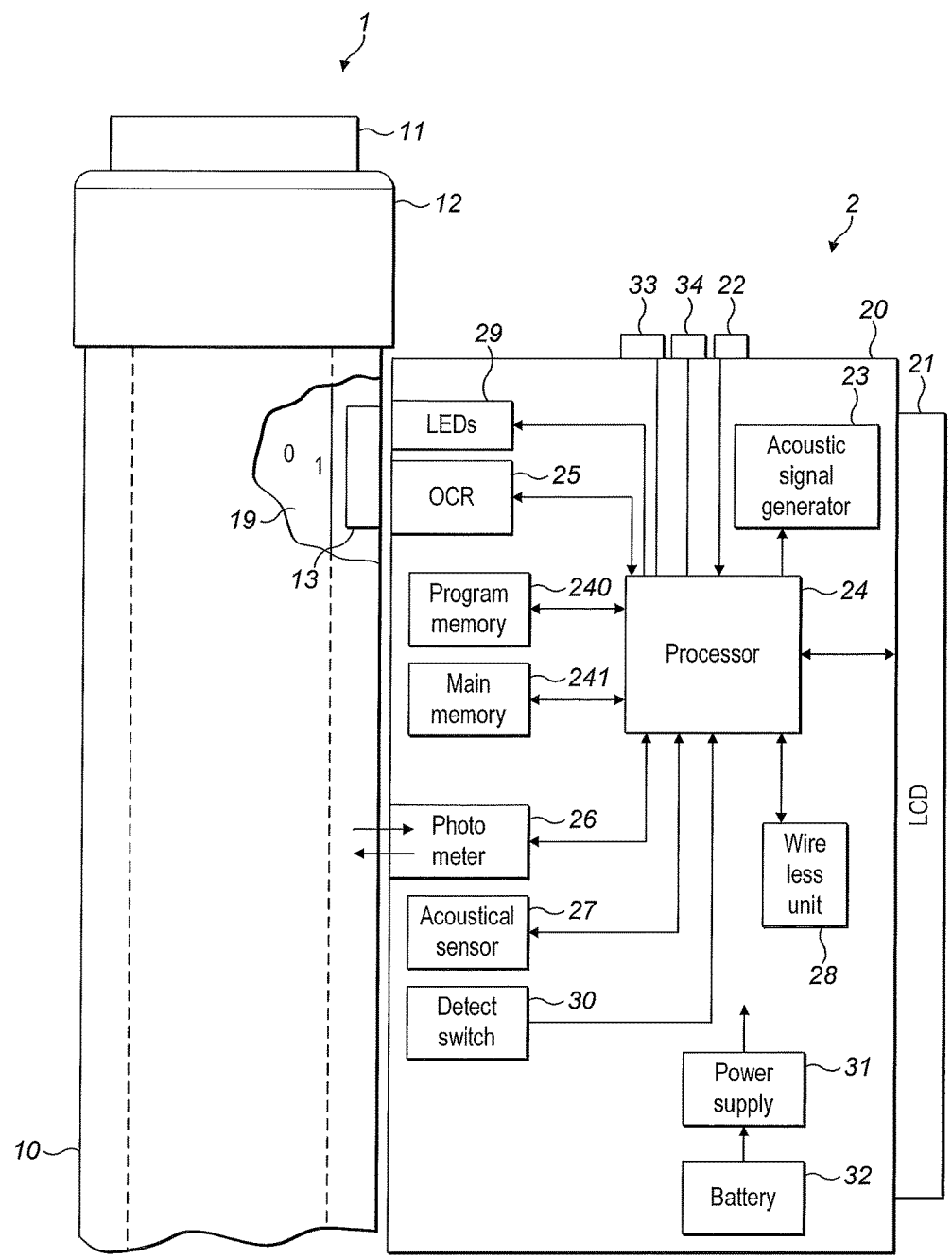
FIG. 3: a schematic view of a sensor device attached to a drug delivery device showing components of the sensor device.

FIG. 3 shows a schematic view of the supplementary device 2 of FIG. 2a in a state where it is attached to injection device 1 of FIG. 1a.

A plurality of components are contained within the housing 20 of supplementary device 2. These are controlled by a processor 24, which may for instance be a microprocessor, a Digital Signal Processor (DSP), Application Specific Integrated Circuit (ASIC), Field Programmable Gate Array (FPGA) or the like. Processor 24 executes program code (e.g. software or firmware) stored in a program memory 240, and uses a main memory 241, for instance to store intermediate results. Main memory 241 may also be used to store a logbook on performed ejections/injections. Program memory 240 may for instance be a Read-Only Memory (ROM), and main memory may for instance be a Random Access Memory (RAM).

In embodiments such as those shown in FIG. 2b, processor 24 interacts with a first button 22, via which supplementary device 2 may for instance be turned on and off. A second button 33 is a communications button. The second button may be used to trigger establishment of a connection to another device, or to trigger a transmission of information to another device. A third button 34 is a confirm or OK button. The third button 34 can be used to acknowledge information presented to a user of supplementary device 2. In embodiments such as those shown in FIG. 2c, two of the buttons 33, 34 may be omitted. Instead, one or more capacitive sensors or other touch sensors are provided.

Processor 24 controls a display unit 21, which is presently embodied as a Liquid Crystal Display (LCD). Display unit 21 is used to display information to a user of supplementary device 2, for instance on present settings of injection device 1, or on a next injection to be given. Display unit 21 may also be embodied as a touch-screen display, for instance to receive user input.

Processor 24 also controls an optical sensor 25, embodied as an Optical Character Recognition (OCR) reader, that is capable of capturing images of the dosage window 13, in which a currently selected dose is displayed (by way of numbers, characters, symbols or glyphs present on the sleeve 19 contained in injection device 1, which numbers are visible through the dosage window 13). OCR reader 25 is further capable of recognizing characters (e.g. numbers) from the captured image and to provide this information to processor 24. Alternatively, unit 25 in supplementary device 2 may only be an optical sensor, e.g. a camera, for capturing images and providing information on the captured images to processor 24. Then processor 24 is responsible for performing OCR on the captured images. The processor 24 may be configured to perform two or more different OCR processes which each use different algorithms.

Processor 24 also controls light-sources such as light emitting diodes (LEDs) 29 to illuminate the dosage window 13, in which a currently selected dose is displayed. A diffuser may be used in front of the light-sources, for instance a diffuser made from a piece of acrylic glass. Furthermore, the optical sensor may comprise a lens system, for instance including two aspheric lenses, leading to a magnification. The magnification ratio (image size to object size ratio) may be smaller than 1. The magnification ratio may be in the range of 0.05 to 0.5. In one embodiment the magnification ration may be 0.15.

Processor 24 further controls a photometer 26, that is configured to determine an optical property of the housing 10 of injection device 1, for example a colour or a shading. The optical property may only be present in a specific portion of housing 10, for example a colour or colour coding of sleeve 19 or of an insulin container comprised within injection device 1, which colour or colour coding may for instance be visible through a further window in housing 10 (and/or in sleeve 19). Information on this colour is then provided to processor 24, which may then determine the type of injection device 1 or the type of insulin contained in injection device 1 (e.g. SoloStar Lantus with purple colour and SoloStar Apidra with blue colour). Alternatively, a camera unit may be used instead of photometer 26, and an image of the housing, sleeve or insulin container may then be provided to processor 24 to determine the colour of the housing, sleeve or insulin container by way of image processing. Further, one or more light sources may be provided to improve reading of photometer 26. The light source may provide light of a certain wavelength or spectrum to improve colour detection by photometer 26. The light source may be arranged in such a way that unwanted reflections, for example by dosage window 13, are avoided or reduced. In an example embodiment, instead of or in addition to photometer 26, a camera unit may be deployed to detect a code (for instance a bar code, which may for instance be a one- or two-dimensional bar code) related to the injection device and/or the medicament contained therein. This code may for instance be located on the housing 10 or on a medicament container contained in injection device 1, to name but a few examples.

This code may for instance indicate a type of the injection device and/or the medicament, and/or further properties (for instance a expiration date).

Processor 24 further controls (and/or receives signals from) an acoustic sensor 27, which is configured to sense sounds produced by injection device 1. Such sounds may for instance occur when a dose is dialed by turning dosage knob 12 and/or when a dose is ejected/injected by pressing injection button 11, and/or when a prime shot is performed. These actions are mechanically similar but nevertheless sound differently (this may also be the case for electronic sounds that indicate these actions). Either the acoustic sensor 27 and/or processor 24 may be configured to differentiate these different sounds, for instance to be able to safely recognize that an injection has taken place (rather than a prime shot only).

Processor 24 further controls an acoustical signal generator 23, which is configured to produce acoustical signals that may for instance be related to the operating status of injection device 1, for instance as feedback to the user. For example, an acoustical signal may be launched by acoustical signal generator 23 as a reminder for the next dose to be injected or as a warning signal, for instance in case of misuse. Acoustical signal generator may for instance be embodied as a buzzer or loudspeaker. In addition to or as an alternative to acoustical signal generator 23, also a haptic signal generator (not shown) may be used to provide haptic feedback, for instance by way of vibration.

Processor 24 controls a wireless unit 28, which is configured to transmit and/or receive information to/from another device in a wireless fashion. Such transmission may for instance be based on radio transmission or optical transmission. In some embodiments, the wireless unit 28 is a Bluetooth transceiver. Alternatively, wireless unit 28 may be substituted or complemented by a wired unit configured to transmit and/or receive information to/from another device in a wire-bound fashion, for instance via a cable or fibre connection. When data is transmitted, the units of the data (values) transferred may be explicitly or implicitly defined. For instance, in case of an insulin dose, always International Units (IU) may be used, or otherwise, the used unit may be transferred explicitly, for instance in coded form.

Processor 24 receives an input from a pen detection switch 30, which is operable to detect whether the pen 1 is present, i.e. to detect whether the supplementary device 2 is coupled to the injection device 1. A battery 32 powers the processor 24 and other components by way of a power supply 31.

The supplementary device 2 of FIG. 3 is thus capable of determining information related to a condition and/or use of injection device 1. This information is displayed on the display 21 for use by the user of the device. The information may be either processed by supplementary device 2 itself, or may at least partially be provided to another device (e.g. a blood glucose monitoring system).

The injection device 1 and supplemental device 2 are configured such that the field of view of the optical sensor 25 is positioned approximately centrally over the dose window 13. Manufacturing tolerances may mean that the field of view is off-centred slightly, both in the horizontal and vertical directions.

In some embodiments, due to space restrictions and the need for the numbers to be of a certain size, only even numbers are printed on the number sleeve 19. In some other embodiments, only odd numbers may be printed on the number sleeve. However, any number of units of medicament can be dialed into the injection device 1. In some alternative embodiments, every number, i.e. ascending integer numbers, may be printed on the sleeve. In these embodiments, it may be possible to dial half-unit doses into the injection device. The injection device may be limited to a maximum dialed dose of 80 units. In further alternative embodiments, only every $3^{rd}$, $41^{th}$ or $5^{th}$ number may be printed. The dose positions between the printed numbers may be indicated by tick marks. The term "printed" is used herein to indicate that the numbers are marked on the surface of the number sleeve, however the skilled person would understand that the numbers may be printed, etched, marked, attached, or otherwise made visible to the optical sensor 25 of the supplementary device 2 in a number of known ways.

In the following embodiments, it will be assumed that only the even numbers are printed on the dose sleeve 19, but that any number of units may be dialed into the injection device.

The processor 24 is configured to execute an algorithm which allows the numbers (or partial numbers) visible in the field of view of the optical sensor 25 to be separated and prepared for comparison with stored templates in order to identify them. This algorithm performs an optical character recognition (OCR) process on the visible numbers and uses the results of the OCR process in order to determine accurately the dose which is currently dialed into the injection device 1. The algorithm may be embodied in software or firmware and may be stored in the program memory 240 of the supplemental device 2. The processor 24 and memory 240 storing the algorithm together may be referred to herein as a "processor arrangement".

The entire algorithm can be divided into a pre-processing part, an OCR-part, and a post-processing part, wherein each part generally involving several steps.

In the pre-processing part image data quality is assessed and improved by executing the following steps:
Defective and bad pixel correction
Light correction
Distortion and slant correction For example, an exposure control algorithm rejects pictures that are too bright or too dark and a new picture is taken with adjusted exposure parameters. The numbers may be printed on a slant for ease of recognition and positioning by a human, but may be easier to decode if this slant is removed. The pre-processing is an optional feature. The OCR part of the algorithm can be designed to perform to the required standard without pre-processing of the image and/or the optical sensor 25 can be configured to produce images of sufficient quality for OCR to be performed on them directly.

In the OCR part, the image data is then further processed and at the end a recognized character is available. The OCR process comprises the steps of:
Binarization
Segmentation
Pattern matching
Position calculation The post-processing may involve various checks and the production of a result to be displayed. The post-processing comprises the following steps:
Perform sanity checks
Hysteresis calculation
Show end result on display Some aspects of the disclosure relate to the segmentation part of the OCR process. The pre-processing, post-processing and other parts of the OCR process are optional features.

Due to the high reliability requirements of the sensor device 2, there may in some embodiments be two OCR algorithms that are operated in parallel. The two OCR algorithms have the same input (image) and are intended to provide the same output. They both perform similar steps however the individual methods used in each step may vary. These two OCR algorithms may differ in one of the binarization, segmentation, pattern matching and position calculation steps or in more than one of these steps. Having two OCR-parts which use different methods to provide the same result increases the reliability of the entire algorithm as the data has been processed in two independent ways.

A key challenge is to implement an image capture and subsequent OCR process including segmentation into a small system that is reliably capable of recognizing numbers, characters, and/or glyphs from a display to determine a dose value. The system is battery powered, small and has limited imaging as well as processing capabilities owed to the compact design and life time requirements. A processor for this kind of device typically has a clock rate of about 100 MHz or below, a memory of up to 32 kByte RAM and 512 kb flash (these specifications are exemplary and not intended to be limiting). However, the result of the OCR process should be available in real time, meaning that the user dialing in a dose can read it from the supplemental device while dialing. A typical computation time would be about 70 ms.

Figure 4:
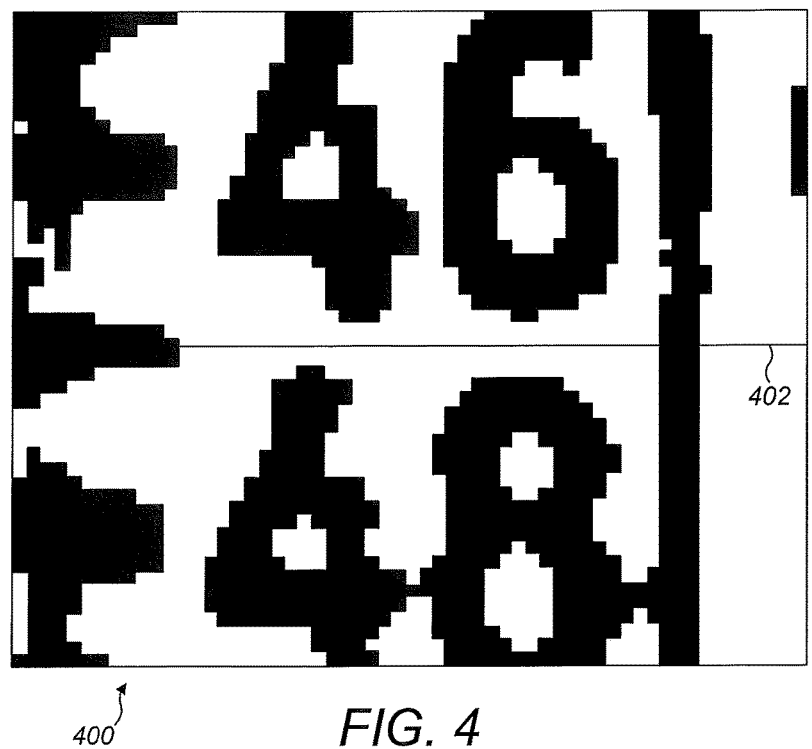
FIG. 4: an example of an image of the dose window after binarization.

FIG. 4 shows an example of an image 400 of the dose window 13 after binarization with a dose of "47" units dialed in. The solid horizontal line 402 represents the centre line of the field of view of the optical sensor 25. An image of the dose window 13 is first captured by the optical sensor 25. After applying the pre-processing steps described above, a greyscale image is converted into a purely black and white image through a binarization process. According to a design of injection pen having dark numbers on a bright sleeve, the black and white image would indicate the presence of digits with black pixels and the absence of digits with white pixels.

In some embodiments a fixed threshold is used to separate between black and white pixels. Pixels that have a value at or above the threshold become white, pixels below the threshold become black in the binarized picture. A high threshold will lead to artefacts (black parts in white areas), whereas a low threshold has the risk that in some cases parts of digits are missing. In some embodiments, the threshold is chosen so that in no case are parts of digits are missing because the algorithm is in general robust against artefacts (i.e. an accurate OCR process can be performed in the presence of some artefacts). In tests, a sensor capable of detecting 256 grey values was used and a threshold value of 127 showed good results.

In one proposed algorithm, a segmentation process is then performed which analyses the binarized image from right to left. In this process, the right hand margin is excluded and the position of the right hand column of numbers is identified. Then, it is determined if there is a left hand column of numbers. For the numbers 0-8, there is only a right hand column of numbers. Finally, the tick marks at the left hand side are excluded, leaving only the isolated number column(s). This proposed algorithm works well provided that the right hand column of numbers is cleanly separated from the right hand margin.

As can be seen in FIG. 4, in some instances, the numbers are shifted sufficiently far to the right that the right hand column of numbers and the right hand margin are merged together. In this instance, the algorithm will excluded the entire right hand column of numbers and will fail to correctly recognise the dialed dose.

The algorithm analyses the image data differently and is able to correctly isolate the right hand column of numbers, even where it is merged with the right hand margin, as will now be described.

The processor 24 first performs a "vertical projection" in which the pixel columns making up the binarized image are analysed. Each pixel column is analysed individually and the sum of the number of black pixels in each column is computed.

Figure 5:
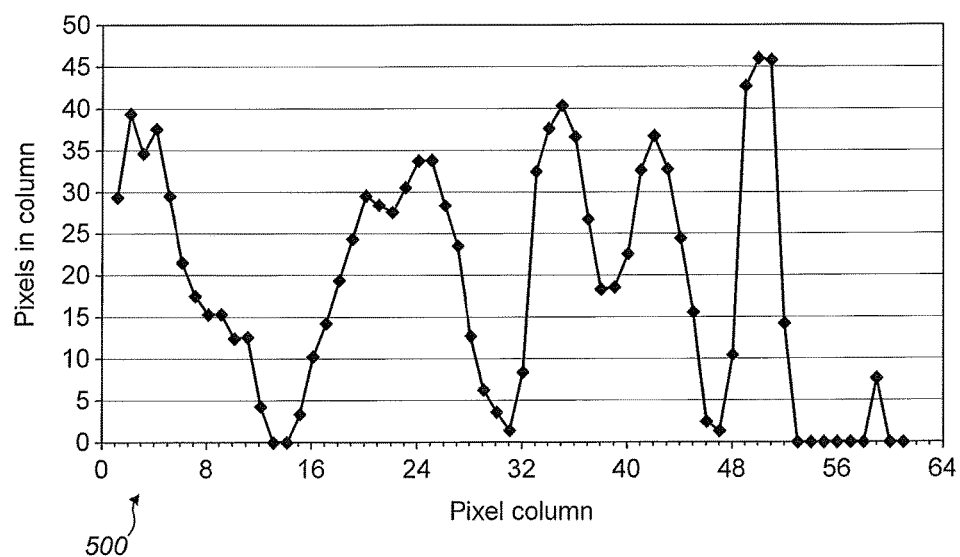
FIG. 5: a graph showing the result of the vertical projection on the image of FIG. 4.

FIG. 5 is a graph 500 showing the result of this vertical projection on the image 400 in FIG. 4. This raw data is then smeared out by combining adjacent columns according to the formula:

$$C_y = B_{y-2} + 4B_{y-1} + 6B_y + 4B_{y+1} + B_{y+2}$$

Where $C_y$ is the smeared out projection value and $B_y$ is the sum of the black pixels in column 'y'.

Alternatively, the following formula could be used:

$$C_y = B_{y-2} + 4B_{y-1} + 8B_y + 4B_{y+1} + B_{y+2}$$

Figure 6:
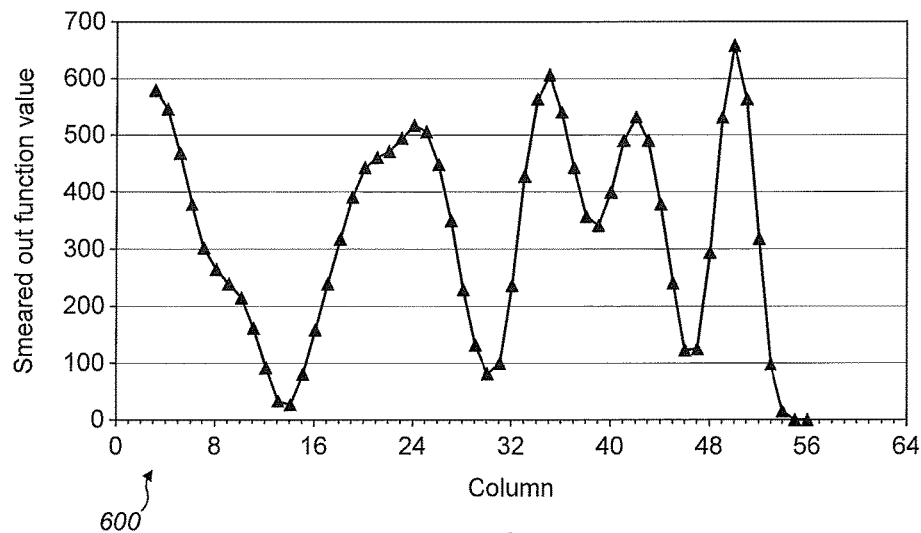
FIG. 6: a graph showing the result of a smearing function on the image data from FIG. 4.

FIG. 6 is a graph 600 showing the result of the smearing function on the image data from FIG. 4. This smoothing out removes small disturbances and prevents them from adversely affecting the result of the algorithm. In practice, any formula which smears out the function so as to remove the effect of small disturbances may be used and the specific formulas above are given as examples only.

The algorithm then separates the pixel columns into different pixel groups and groups of excluded columns by using a number of different thresholds, noted in capital letters below. When the curve falls below VERICAL_SEPARATE_THRESHOLD, the pixels on either side are assumed to be in different entities and are put into different pixel groups. The column having the minimum number of black pixels is used as the divider and is not part of any pixel group.

When the curve falls below VERICAL_WHITESPACE_THRESHOLD, the area is assumed to be empty i.e. white. After the pixel groups have been isolated and identified, each pixel group is trimmed from both sides by removing columns at the edges which have fewer than VERICAL_THRESHOLD black pixels.

Figure 7:
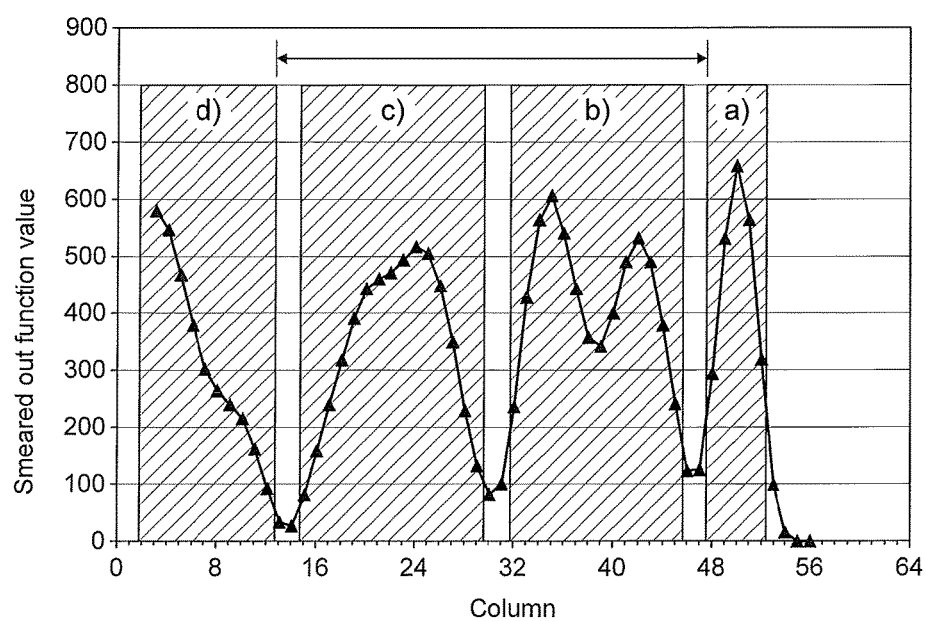
FIG. 7: the result of the application of various threshold values to the image data of FIG. 4.

FIG. 7 shows the result of the application of these threshold values to the image data of FIG. 4. The separated pixel groups are identified by shading/hatching and with letters a)-d). The groups of excluded columns are un-shaded.

In the previously proposed algorithm, a pixel group was marked as invalid if the curve rose above VERTICAL_INVALID_THRESHOLD, which happens only when a black vertical line runs through the image almost without any white pixels, as is the case with the right hand margin represent by pixel group a). Pixel group a) may also be described herein as the right hand edge area or region, the right hand frame area or region, or the right hand border area or region and these terms may be used interchangeable herein. "Invalid" in this case means that the pixel group is not considered to represent printed numbers. However, in the case where the gap between pixel groups a) and b) is not clean, i.e. where the curve does not fall below VERTICAL_SEPARATE_THRESHOLD, then the previous algorithm will exclude pixel groups a) and b) together. Since pixel group b) represents the right hand character column, the algorithm will fail to correctly identify the numbers in the image. Thus, the present algorithm does not use the VERTICAL_INVALID_THRESHOLD, but separates pixel group b) from the right hand margin in a different way, described below.

The task of the algorithm is to identify the pixel groups which represent character columns. In general, each character column comprises more than one character, vertically aligned. These are separated from one another in a later step.

In some embodiments, the algorithm is arranged to invalidate pixel groups where they touch the left hand border of the image (and optionally where they touch the right hand border of the image). Again, "invalidate" in this usage means that the pixel groups are excluded from consideration as numbers. This results in pixel group d) being excluded from consideration.

The algorithm identifies the pixel group representing the left most character column in the image data. This is done by identifying the pixel group immediately to the right of the left most group of excluded columns. For example, this could be achieved by identifying the first group of pixels to the right (having a higher column number) than the first column which is below VERICAL_SEPARATE_THRESHOLD. Thus, pixel group c) is identified as representing the left most character column.

Next, the algorithm determines whether there are one or two pixel groups representing character columns in the image data. This is done by determining the width of the left most group of excluded columns i.e. the columns between pixel groups d0 and c0 in FIG. 7. If the numbers visible in the image are arranged in a single column, i.e. the numbers 0-8, then the width of this first gap will be larger than if the image contains two columns of numbers. Thus if the first group of excluded columns is wider than a threshold value MAX_LEFT_MARGIN_TWO_DIGITS, then it is determine that the image data comprises only a single column of numbers. If the first group of excluded columns is narrower than this threshold, it is assumed that two character columns are present.

Where the algorithm determines that there are two pixel groups representing character columns in the image, the extent of the right hand digit can be inferred. Therefore, even if the right hand digits are merged with the black margin area at the right of the image, the digits can be separated for analysis.

Firstly, the group of excluded columns to the right of the left most character column is identified. In most cases this will be the second group of excluded columns from the left of the image. It will then usually be clear where the left hand boundary of the right hand character column is located (see description below for some special cases). The width (in pixels) of the numbers which appear in the image data is known, since the design of the injection device 1 and supplementary device 3 mean that the optical sensor 35 is positioned at a predetermined distance from the dose window 13. In one example, the width of each number except "1" is fourteen pixels, while the width of "1" is seven pixels. Each number may have a height of 26 pixels. However the exact number of pixels depends on the font size of the printed numbers as well as the type of font used, the sensor device 2 and its arrangement with regards to the injection device 1 and any magnification caused by lenses in the sensor device or by the window 13. Continuing with the example above, as only even numbers are printed on the number sleeve 19, the number "1" only appears in the left hand character column (numbers 10-18), such that the right hand character column will only ever contain a number of fourteen pixels width. Therefore, once the left hand boundary of the right hand character column is identified, the right hand boundary is defined as being fourteen pixels further right. In order to increase reliability, the digit widths may be set as a small number of pixel columns more than the expected width.

After horizontal segmentation of the character columns into individual digits, an optional digit trimming process can be implemented as follows to account for tolerances of the optical system as well as printing tolerances of the digits, for example the digit width and position. This process can be applied to both the left and right hand edges of any digit, but is particularly useful when applied to the right hand edge of the right hand digits in order to ensure that they are sufficiently separated from the right hand margin [pixel group a)] for an accurate OCR analysis. Thus, this optional trimming can make the OCR identification more accurate.

The digits are already separated into right and left character columns.

Using a right hand digit as an example, first a vertical projection is performed on the right most pixel column of the right hand character column to determine the number of black pixels in this column. The expected height of the digit in this example is 26 pixels. If, for example, more than 19 of the 26 pixels in this column are black, then the column is determined to be most likely part of pixel group a) rather than part of the digit and it is rejected. This could especially be important for the differentiation of the digits 6 and 8 respectively, where a black vertical column on the right side could easily lead to a misinterpretation, i.e. that a "6" is taken for an "8" in the character recognition step.

On the other hand, in the case that 6 or fewer pixels in the right most pixel column are black, then the column may also be rejected because it is not necessary for the OCR step. Due to the fact that only the even numbers (2, 4, 6, 8) appear in the right hand character column, there are always more black pixels in the column immediately left of the right most pixel column. So rejecting the last column has no negative effect on the OCR.

Figure 8:
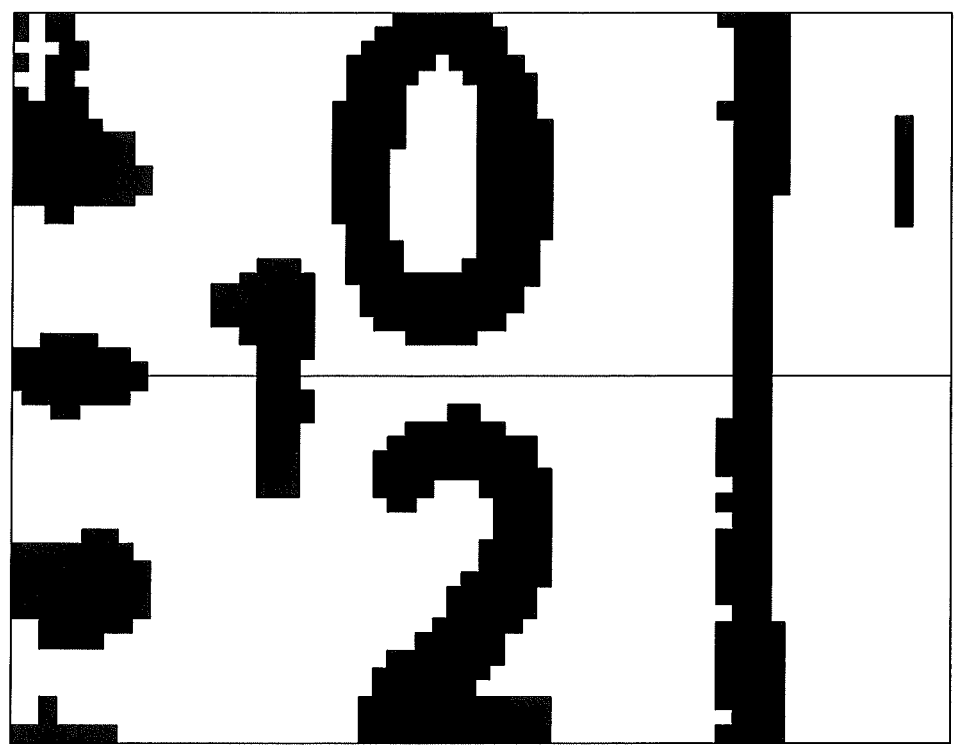
FIG. 8: an example of an image of the dose window after binarization showing the smaller "1" is used to indicate a single unit of medicament.

In some injection device designs, a smaller "1" is used to indicate a single unit of medicament. This smaller 1 is located vertically between the "0" and "2", but offset to the left, as shown in the binarized image 800 of FIG. 8. This "1" is smaller than the one used for the numbers 10-18. Where this special case exists the algorithm has additional steps to recognise the situation and ensure that the numbers are correctly decoded. This involves calculating the width of the first character column as before. If the width is below a threshold value DIGIT_MIN_ONE_WIDTH, then it is inferred that the column represents the small "1" shown in FIG. 8. This column is then invalidated and not used in the subsequent OCR and position detection steps. If the first character column is equal to or wider than DIGIT_MIN_ONE_WIDTH, but is below a threshold DIGIT_MAX_ONE_WIDTH, the it is inferred that the first character column contain a "normal" one (as in the numbers 10-18). This information can subsequently be used in the OCR process by setting the maximum possible valid result as "19".

Another special case exists where "9" units are dialed into the injection device 1. In this case, the numbers "8" and "10" appear partially or in full in the image, with the number "8" positioned approximately above the gap between the one and zero of the "10". Therefore, the algorithm performs an additional check to see if the left hand character column is wider than a threshold MAX_DIGIT_WIDTH (too wide to be a single digit). If this is the case, then it is inferred that the number sleeve 19 is between the numbers 8 and 10. The thresholds for dividing the character columns may then be adjusted accordingly to allow the digits to be isolated for analysis.

Figure 9:
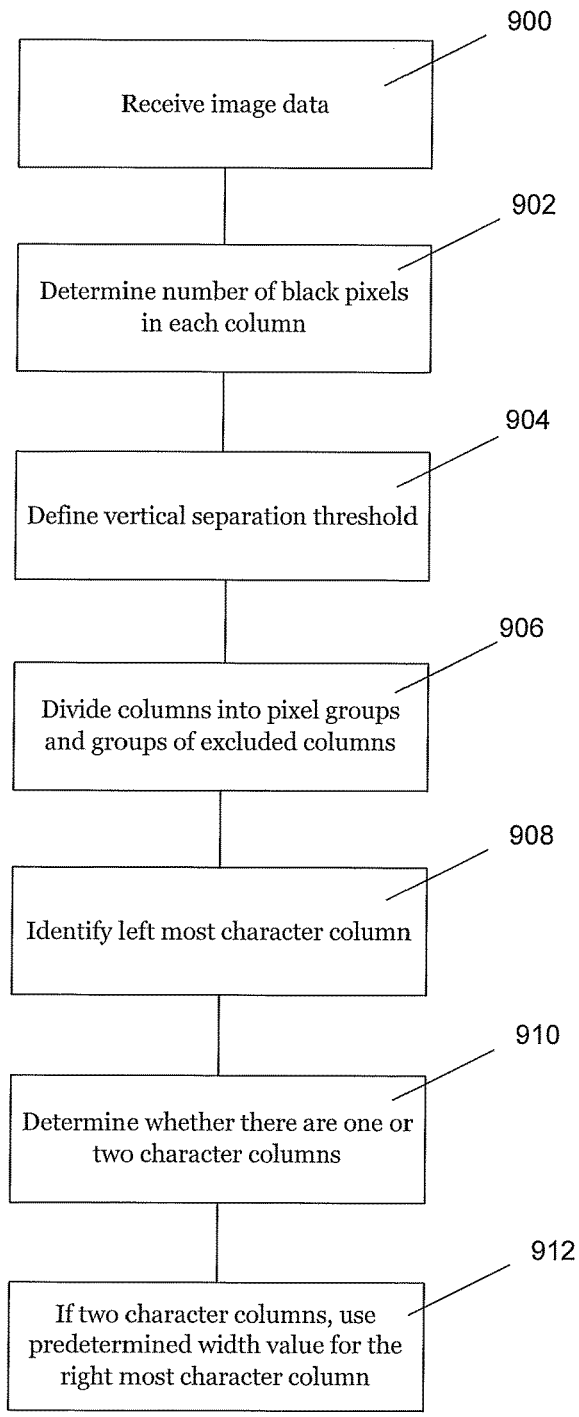
FIG. 9: a flow chart illustrating exemplary operation of the processor according to aspects of the disclosure.

FIG. 9 shows a flow chart illustrating exemplary operation of the processor 24 in analysing the images captured by the optical sensor 25.

In step 900 the processor 24 receives image data from the optical sensor 25. This image data may be binarized data, or the processor 24 may perform a binarization process. Alternatively, the processor may perform the next steps on the greyscale image. In step 902 the processor 24 analyses the image data to determine the number of black pixels in each column of the image. In step 904, a vertical separation threshold is defined. In practice this threshold may be predefined and pre-programmed into the memory of the supplementary device. However, it may also be dynamically defined by the processor based on light levels etc.

In step 906 the processor 24 divides the columns of the image into pixel groups separates by groups of excluded columns. This is done by excluding any columns with a number of black pixels below the previously defined vertical separation threshold. In step 908, the processor identifies the pixel group representing the left most character column in the image. This is done by identifying the pixel group immediately to the right of the left most group of excluded columns.

In step 910, the processor 24 determines whether there are one or two groups of pixels representing character columns in the image. This is done by determining the width of the left most group of excluded columns. If the left most group of excluded columns is below a predetermined width then it is assumed that two character columns exist. If the left most group of excluded columns is above the predetermined width then it is assumed that one character column exists.

At step 912, where it is determined that two character columns exist in the image data, a predetermined width value (in pixels) is used for the right hand character columns in the OCR algorithm. This may involve determining the left hand boundary of the right hand character column by identifying the group of excluded columns between the left and right character columns. The right hand boundary is then defined as being the predetermined width value (in pixels) further to the right. After this new vertical segmentation process, the rest of the OCR algorithm is perfumed.

Several further steps are required before the processor 24 can output a result for the number of units of medicament dialed into the injection device 1. These steps are described below for completeness, however they are optional.

The processor 24 then performs a "horizontal projection" in which the pixel rows making up the binarized image are analysed. This proceeds in the same manner as described above for the vertical projection. The result of the horizontal projection is added to that of the vertical projection such that the edges of the visible numbers are identified. In many cases, some of the numbers in the image will be only partly visible. Thus, not all of the edges of the partially visible numbers are detected. The processor 24 may be pre-programmed with the expected height (in pixel rows) of a full number, and so is able to recognise the presence of partially visible numbers.

It is straightforward to see that the "horizontal projection" and the "vertical projection" could equally well be based on an analysis where the sum of white pixels is computed instead, provided that the expected number of white pixels in each row and column is known.

The next step in the OCR process is to select one of the visible numbers to be decoded and identified. This is done by designating one of the numbers as the "primary digit row". The primary digit row is selected based on which visible number has the greatest height. This is because all of the numbers printed on the sleeve have approximately the same height and it can be assumed that the number having the greatest height will be fully visible and therefore easy to decode with a high degree of certainty. If two numbers (having different vertical positions) are visible and have the same height, the uppermost number is selected as the primary digit row. The primary digit row is the number which is subsequently used to determine the dose dialed into the injection device 1.

A pattern matching process is then performed to identify the digits in the primary digit row. Templates for each number may be stored in a memory of the supplementary device 2 and the identified digits may then be compared to these templates. In a straight forward approach the pattern matching could be performed on a pixel-by-pixel basis. However, this may require high computing power. Furthermore, this approach is prone to position variation between the image and the template. In some other embodiments, a feature recognition process is performed. Features may be horizontal, vertical or diagonal lines, curves, circles or closed loops etc. Such features may be recognized in the image of the selected number and compared with templates.

In yet further embodiments, the pattern matching algorithm may be based on a vector comparison process. For example, the templates may be in the form of vectors describing the position and length of each line (continuous run) of black pixels relative to a vertical line extending through the centre of the template. The captured binary image of each digit may similarly be converted into vectors and compared with each stored template in turn to find the best match.

When comparing the vectors of the captured image with a particular digit template, any deviations result in a penalty being applied for the likelihood of a match between the image and that template. The magnitude of the penalty may depend on the number of missing or extra black pixels in the image compared to the template. After the digit image has been compared with each template and all of the penalties have been applied a decision is made as to which digit is present. In good optical conditions, the correct template will have a very low penalty, while all other templates will have a high penalty. If the primary digit row consists of two digits, this process is performed on both digits and the processor 24 then combined the outcomes to produce a final result for the number.

Special measures may exist for certain digits. For example, "1" deviates substantially in width from all other digits resulting in common misdetections. To counter this, if a binary image of a digit is wider than the expected width of "1", then it receives an additional detection penalty when being compared with the stored vector template of "1".

In some exceptional cases, if the confidence level in the result of the pattern matching of the primary digit row is below a certain threshold (e.g. 99%), then the processor may perform a second pattern matching process on one or more of the other visible or partially visible numbers. Since the order of the numbers is known, this second pattern matching can act as a check that the first pattern matching returned the correct result. If the confidence level in the result is still not high enough, then a second image may be captured by the optical sensor 25 and the process repeated. Alternatively, an error message may be displayed.

Once the digit or digits of the primary digit row have been successfully identified, a weighting function is applied in order to determine a dose dialed into the injection device 1. To formulate the weighting function, the vertical position of the primary digit row relative to the centre of the image is determined. This may be done by calculating the offset of the middle pixel row comprising the primary digit row relative to the pixel row of the optical sensor 25 representing the centre line of the image.

For example, in some embodiments the optical sensor comprises a rectangular 64×48 array of photosensitive elements. The resulting binary image is a pixel array having these same dimensions. The $24^{th}$ and/or $25^{th}$ pixel row may be designated as the central row of the image. The position of the middle pixel row comprising the primary digit row is determined. The offset, in pixel rows, between the middle pixel row comprising the primary digit row and the central row or rows of the image is then calculated. This offset may be positive or negative depending on the direction of the offset. The offset is converted into a fraction by dividing it by the distance (in pixel rows) between successive numbers before being applied to the determined numbers accordingly. The offset therefore allows for determining the rotational position of the number relative to the sensor. If the central pixel row of the primary digit row is the same as the central pixel row of the image, then the offset is zero and the position is equal to the primary digit row number. However, due to manufacturing tolerances in the supplementary device 2, and or in the injection device 1 and due to pressure applied on the number sleeve by a user, there is likely to be some offset in most circumstances.

The distance between successive numbers printed on the number sleeve is constant, since the numbers represent a dose which is related to a discrete mechanical movement of the injection device mechanism. Therefore, the distance (in pixel rows) between successive numbers in the captured image should also be constant. The expected height of the numbers and spaces between the numbers is pre-programmed into the algorithm.

As an example, the expected height of each numbers may be 22 pixels and the expected height of the spaces between the numbers may be 6 pixels. Therefore, the distance between the central pixel rows of successive numbers would be 28 pixels.

Continuing this example, if the pixel rows are numbered sequentially from the top to the bottom of the image, the application of the weighting function may be defined mathematically as:

Position=primary digit row number+[2×offset/(expected height of number+expected height of space)]

Where offset=central image row number−primary digit row central row number

Thus, if the primary digit row is in the upper half of the image, then the offset is positive and if the primary digit row is in the lower half of the image, then the offset is negative. For example, if the number shown in the primary digit row is "6" and the offset is zero, then the calculated position would be:

Position=6+[2×0/(28)]=6

Thus a result of "6" would be returned as expected.

Taking another example in which 75 units are dialed into the injection device 1, if the top number, "74", is selected as the primary digit row and there is a positive offset of 11 pixel rows according to the equation above, and again assuming a combined number/space height of 28 pixels, the calculated position would be:

Position=74+[2×11/(28)]=74.79

This result is then rounded up to the nearest whole number, to give a position determination of "75" as expected.

After applying the final post-processing part the processor 24 causes this result to be displayed on the display unit 21 of supplementary device 2. As previously discussed, due to space constraints, not every number may be printed on the number sleeve. In some embodiments, only even numbers are printed on the number sleeve. The position determination step described above allows the supplemental device 2 to display dose values, even though these values may not appear on the number sleeve. Thus a clearer indication of a dialed dose is provided to a user of the supplemental device 2.

If a user is dialing in a dose slowly (i.e. rotating the dosage knob 12 slowly), then the position rounding described above may cause a flickering of the display between two numbers. In order to prevent this, the post-processing step may contain hysteresis rules, such that the displayed number has some dependence on the previously displayed number. This hysteresis calculation may be the last step performed in the algorithm before the result is displayed.

The skilled person will appreciate that the above described weighting function and position determination represents only one example and that numerous other calculation methods may be used to arrive at the same result. The skilled person would also appreciate that the above described mathematical calculation may be modified and improved to reduce the computation time. Thus the exact form of the weighting function is not essential.

The algorithm may also be configured to perform other types of manipulation on the images numbers, for example by changing the size of one or more digits, cropping the numbers to a defined pixel area and shearing numbers printed in a italic font into an upright position. These manipulations may be performed before a pattern matching comparison with the stored templates. Alternatively, these manipulations may be performed in an image pre processing step on the captured images before the binarization process. Additional shading, distortion and exposure correction may also be performed.

The invention claimed is:

1. A method of performing character isolation in an optical character recognition process, the method comprising:
    receiving image data representing one or more character columns;
    determining a number of black pixels in each of the one or more character columns of the image data;
    defining a vertical separation threshold which is a maximum number of black pixels in a column;
    dividing the one or more character columns into different pixel groups and groups of excluded columns by excluding any of the one or more character columns with a number of black pixels below the vertical separation threshold;
    identifying the pixel group representing the left most character column in the image data;
    determining that there are two pixel groups representing the one or more character columns; and
    in response to determining that there are two pixel groups representing the one or more character columns, using a predetermined width value for a right most character column in order to identify a right hand boundary of the right most character column.

2. The method according to claim 1, wherein identifying the pixel group representing the left most character column in the image data comprises identifying the pixel group immediately to the right of the left most group of excluded columns.

3. The method according to claim 1, wherein identifying the pixel group representing the left most character column in the image data comprises excluding the pixel group immediately to the right of the left most group of excluded columns if it is below a minimum digit width threshold such that the second pixel group to the right of the left most group of excluded columns is defined as the left most character column in the image data.

4. The method according to claim 1, wherein determining that there are two pixel groups representing character columns in the image data comprises determining the width of the left most group of excluded columns.

5. The method according to claim 4, wherein determining that there are two pixel groups representing character columns in the image data comprises determining that the width of the left most group of excluded columns is below a maximum left margin threshold value.

6. The method according to claim 1, the method further comprising determining the width of the left most character column in the image data.

7. The method according to claim 6, the method further comprising using the determined width of the left most character column in the image data to determine whether the left most character column comprises exclusively narrow numbers or includes wide numbers.

8. The method according to claim 7, wherein if it is determined that the left most character column comprises exclusively narrow numbers, setting the maximum valid dose result to 19.

9. The method according to claim 1, the method further comprising excluding any pixel group touching the left hand border of the image.

10. The method according to claim 1, the method further comprising identifying a left hand boundary of the right hand character column by identifying a group of excluded columns located between the left hand and right hand character columns.

11. The method claim 1, the method further comprising determining if the left hand character column is wider than a maximum digit width threshold value and if so, determining that numbers in the image data are in the range from 8 to 10.

12. A processor for performing character isolation in an optical character recognition process, the processor configured to:
    receive image data representing one or more character columns;
    determine a number of black pixels in each of the one or more character columns of the image data;
    define a vertical separation threshold which is a maximum number of black pixels in a column;
    divide the one or more character columns into different pixel groups and groups of excluded columns by excluding any columns with a number of black pixels below the vertical separation threshold;
    identify the pixel group representing the left most character column in the image data;
    determine that there are two pixel groups representing character columns; and
    in response to determining that there are two pixel groups representing character columns, use a predetermined width value for a right most character column in order to identify a right hand boundary of the right most character column.

13. The processor according to claim 12, wherein the processor is configured to identify the pixel group representing the left most character column in the image data by identifying the pixel group immediately to the right of the left most group of excluded columns.

14. The processor according to claim 12, wherein the processor is configured to determine whether there are one or two pixel groups representing character columns in the image data by determining the width of the left most group of excluded columns.

15. A supplemental device for attachment to an injection device, the supplemental device comprising:
    an imaging arrangement configured to capture an image of one or more numbers present on a moveable component of the injection device; and
    a processor configured to:
        receive image data representing one or more character columns;
        determine a number of black pixels in each of the one or more character columns of the image data;
        define a vertical separation threshold which is a maximum number of black pixels in a column;
        divide the one or more character columns into different pixel groups and groups of excluded columns by excluding any columns with a number of black pixels below the vertical separation threshold;
        identify the pixel group representing the left most character column in the image data;
        determine whether there are one or two pixel groups representing character columns in the image data;
        determine that there are two pixel groups representing character columns; and
        in response to determining that there are two pixel groups representing character columns, use a predetermined width value for a right most character column in order to identify a right hand boundary of the right most character column.

16. The supplemental device of claim 15, wherein the processor is configured to identify the pixel group representing the left most character column in the image data by identifying the pixel group immediately to the right of the left most group of excluded columns.

17. The supplemental device of claim 15, wherein the processor is configured to determine whether there are one or two pixel groups representing character columns in the image data by determining the width of the left most group of excluded columns.

* * * * *

UNITED STATES PATENT AND TRADEMARK OFFICE
CERTIFICATE OF CORRECTION

PATENT NO. : 10,133,948 B2
APPLICATION NO. : 15/324506
DATED : November 20, 2018
INVENTOR(S) : Dietmar Hammen Page 1 of 1

It is certified that error appears in the above-identified patent and that said Letters Patent is hereby corrected as shown below:

On the Title Page

Item (72), Column 1 (Inventor), Line 1, delete "Franfkurt" and insert -- Frankfurt --, Item (73), insert -- Assignee: Sanofi-Aventis Deutschland GMBH, Frankfurt am Main (DE) --, as a new field entry, Item (74), Column 2 (Primary Examiner), Line 2, below "Motsinger" insert -- Attorney, Agent, or Firm – Fish & Richardson P.C. --, as a new field entry, In the Claims Column 18, Line 36, in Claim 11, delete "method claim" and insert -- method according to claim --.

Signed and Sealed this
Twenty-eighth Day of May, 2019

Andrei Iancu
*Director of the United States Patent and Trademark Office*